United States Patent
Fayyaz et al.

(10) Patent No.: US 12,106,487 B2
(45) Date of Patent: Oct. 1, 2024

(54) FEATURE PREDICTION FOR EFFICIENT VIDEO PROCESSING

(71) Applicant: Microsoft Technology Licensing, LLC, Redmond, WA (US)

(72) Inventors: Mohsen Fayyaz, Bonn (DE); Hamidreza Vaezi Joze, Redmond, WA (US); Eric Chris Wolfgang Sommerlade, Oxford (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 400 days.

(21) Appl. No.: 17/535,551

(22) Filed: Nov. 24, 2021

(65) Prior Publication Data
US 2023/0162372 A1    May 25, 2023

(51) Int. Cl.
*G06K 9/00* (2022.01)
*G06N 3/08* (2023.01)
(Continued)

(52) U.S. Cl.
CPC ............... *G06T 7/20* (2013.01); *G06N 3/08* (2013.01); *G06V 10/40* (2022.01); *G06V 10/95* (2022.01);
(Continued)

(58) Field of Classification Search
CPC .......................................... G06T 2207/20081
See application file for complete search history.

(56) References Cited

U.S. PATENT DOCUMENTS

| 2011/0182352 A1* | 7/2011 | Pace | H04N 19/543 |
| | | | 375/240.1 |
| 2013/0170541 A1* | 7/2013 | Pace | G06T 9/001 |
| | | | 375/240.02 |

(Continued)

FOREIGN PATENT DOCUMENTS

WO    2020238560 A1    12/2020

OTHER PUBLICATIONS

Fayyaz, et al., "3D CNNs with Adaptive Temporal Feature Resolutions," in Proceedings of the IEEE/CVF Conference on Computer Vision and Pattern Recognition (CVPR), Jun. 2021, pp. 4731-4740.
(Continued)

*Primary Examiner* — Hadi Akhavannik

(57) ABSTRACT

A technique is described herein that interprets some frames in a stream of video content as key frames and other frames as predicted frames. The technique uses an image analysis system to produce feature information for each key frame. The technique uses a prediction model to produce feature information for each predicted frame. The prediction model operates on two inputs: (1) feature information that has been computed for an immediately-preceding frame; and (2) frame-change information. A motion-determining model produces the frame-change information by computing the change in video content between the current frame being predicted and the immediately-preceding frame. The technique reduces the amount of image-processing operations that are used to process the stream of video content compared to a base case of processing all of the frames using the image analysis system. As such, the technique uses less computing resources compared to the base case.

20 Claims, 9 Drawing Sheets

(51) Int. Cl.
G06T 7/20 (2017.01)
G06V 10/40 (2022.01)
G06V 10/94 (2022.01)

(52) U.S. Cl.
CPC ............... *G06T 2207/20081* (2013.01); *G06T 2207/20084* (2013.01)

(56) References Cited

U.S. PATENT DOCUMENTS

| | | | | |
|---|---|---|---|---|
| 2015/0189318 | A1* | 7/2015 | Pace | H04N 19/543 375/240.08 |
| 2018/0295375 | A1* | 10/2018 | Ratner | G06T 7/12 |
| 2019/0130639 | A1* | 5/2019 | Boyce | G06F 3/013 |
| 2021/0192756 | A1* | 6/2021 | Huang | G06N 3/045 |
| 2021/0232825 | A1* | 7/2021 | Tang | G06V 20/41 |

OTHER PUBLICATIONS

Goyal, et al., "Accurate, Large Minibatch SGD: Training ImageNet in 1 Hour," ArXiv e-print, arXiv:1706.02677v2 [cs.CV], Apr. 30, 2018, 12 pages.

Habibian, et al., "Skip-Convolutions for Efficient Video Processing," in Proceedings of the IEEE/CVF Conference on Computer Vision and Pattern Recognition (CVPR), Jun. 2021, pp. 2695-2704.

Howard, et al., "MobileNets: Efficient Convolutional Neural Networks for Mobile Vision Applications," arXiv e-print, arXiv:1704. 04861v1 [cs.CV], Apr. 17, 2017, 9 pages.

Dosovitskiy, et al., "An Image is Worth 16x16 Words: Transformers for Image Recognition at Scale," arXiv e-prints, arXiv:2010. 11929v2 [cs.CV], Jun. 3, 2021, 22 pages.

Loshchilov, et al., "SGDR: Stochastic Gradient Descent with Warm Restarts," in arXiv e-prints, arXiv:1608.03983v5 [cs.LG], May 3, 2017, 16 pages.

Shen, et al., "The First Facial Landmark Tracking in-the-Wild Challenge: Benchmark and Results," in Proceedings of the IEEE International Conference on Computer Vision Workshops, 2015, pp. 50-58.

Sullivan, et al., "Overview of the High Efficiency Video Coding (HEVC) Standard," in IEEE Transactions on Circuits and Systems for Video Technology, 22(12), Dec. 2012, pp. 1649-1668.

O'Shea, et al., "An Introduction to Convolutional Neural Networks," in arXiv e-prints, arXiv:1511.08458v2 [cs.NE], Dec. 2, 2015, 11 pages.

Wu, et al., "Group Normalization," in arXiv e-prints, arXiv:1803. 08494v3 [cs.CV], Jun. 11, 2018, 10 pages.

He, et al., "Deep Residual Learning for Image Recognition," in arXiv e-prints, arXiv:1512.03385v1 [cs.CV], Dec. 10, 2015, 12 pages.

Chollet, Francois "Xception: Deep Learning with Depthwise Separable Convolutions," in arXiv e-prints, arXiv:1610.02357v3 [cs. CV], Apr. 4, 2017, 8 pages.

Vaezi Joze, et al., "Simultaneously Correcting Image Degradations of Multiple Types in an Image of a Face," U.S. Appl. No. 17/164,755, filed Feb. 1, 2021, 44 pages.

Vaezi Joze, et al., "Neural Network Target Feature Detection," U.S. Appl. No. 17/314,466, filed May 7, 2021, 37 pages.

Search Report and Written Opinion for PCT/US2022/041771, mailed Dec. 2022, 13 pages.

English translation of WO2020238560A1, accessible at https://patents.google.com/patent/WO2020238560A1/en?pq=wo2020238560, Google Patents, accessed Dec. 15, 2022, 15 pages.

Anantrasirichai, et al., "Artificial Intelligence in the Creative Industries: A Review," in ArXiv, Cornell University, arXiv:2007.12391v4 [cs.CV], Mar. 2, 2021, 62 pages.

* cited by examiner

OVERVIEW OF OPERATION OF THE VIDEO-PROCESSING SYSTEM 1002

OBTAIN A FIRST FRAME OF VIDEO CONTENT, THE FIRST FRAME BEING INTERPRETED AS A KEY FRAME.
1004

CONVERT THE FIRST FRAME INTO FIRST FEATURE INFORMATION USING AN IMAGE ANALYSIS SYSTEM.
1006

CACHE THE FIRST FEATURE INFORMATION IN A DATA STORE.
1008

OBTAIN A SECOND FRAME OF VIDEO CONTENT, THE SECOND FRAME BEING INTERPRETED AS A PREDICTED FRAME.
1010

MAP THE FIRST FRAME AND THE SECOND FRAME INTO FIRST FRAME-CHANGE INFORMATION USING A MOTION-DETERMINING MODEL, THE FIRST FRAME-CHANGE INFORMATION EXPRESSING A CHANGE IN VIDEO CONTENT FROM THE FIRST FRAME TO THE SECOND FRAME.
1012

CONVERT THE FIRST FRAME-CHANGE INFORMATION AND THE FIRST FEATURE INFORMATION INTO SECOND FEATURE INFORMATION USING A PREDICTION MODEL.
1014

CACHE THE SECOND FEATURE INFORMATION IN THE DATA STORE.
1016

FIG. 10

FEATURE PREDICTION FOR EFFICIENT VIDEO PROCESSING

BACKGROUND

Machine-trained image-processing models have been developed to achieve various objectives. For example, some models detect objects which appear in the images. Other models classify content that appears in the images. Other models enhance the quality of input images. Still other models introduce new content into the input images, and so on. While these machine-trained models may meet specified quality metrics, there remains technical issues that prevent the adoption of these models in computing devices commonly available to consumers. That is, these machine-trained models often consume a significant amount of computing resources. A computing device may not have sufficient computing resources to run these models without experiencing failures.

The above problem is compounded for the case of video content, which is composed of a stream of video frames. A computing device may not have sufficient resources to perform its frame-based operations within a frame rate specified by a video-related application. In some cases, the failure of a machine-trained model may manifest itself in a halting playback of the video content.

SUMMARY

A video-processing technique is described herein that interprets some frames in a stream of video content as key frames and other frames as predicted frames. The technique uses an image analysis system to produce feature information for each key frame. The technique uses a prediction model to produce feature information for each predicted frame. The prediction model receives input from two sources. As a first source, the prediction model receives cached feature information that has been computed for an immediately-preceding frame. As a second source, the prediction model receives frame-change information from a motion-determining model. The motion-determining model, in turn, produces the frame-change information by computing the change in video content between the current frame being predicted and the immediately-preceding frame.

The video-processing technique reduces the number of image-processing operations that are performed compared to a base case in which all of the frames are processed using the image analysis system. As a result, the video-processing technique uses less computing resources compared to the base case. This outcome stems from the fact that the process of producing feature information using the image analysis system is more computationally intensive compared to the process of producing feature information using the prediction model in combination with the motion-determining model.

Other implementations of the technique can operate on other kinds of data items besides, or in addition to, video data items. For example, other implementations can operate on a temporal series of measurements of any kind obtained from any source(s).

The above-summarized technique can be manifested in various types of systems, devices, components, methods, computer-readable storage media, data structures, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 1 specifically represents the operation of the video-processing system at a first instance of time.

FIGS. 10 and 11 show a process that explains one manner of operation of the video-processing system of FIGS. 1-3.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a video-processing system for expediting the processing of a stream of video content. Section B sets forth illustrative methods that explain the operation of the video-processing system of Section A. And Section C describes illustrative computing functionality that can be used to implement any aspect of the features described in Sections A and B.

A. Illustrative Video-Processing System

Figure 1:
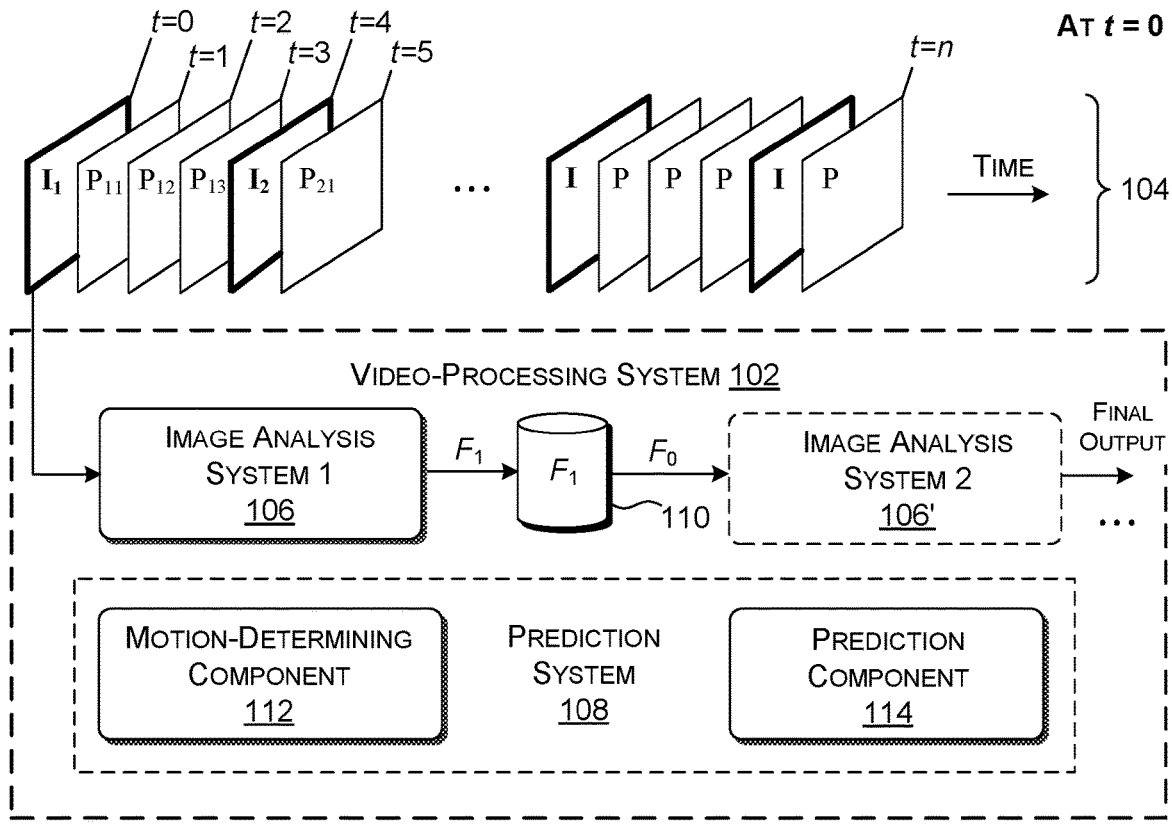
FIG. 1 shows an illustrative video-processing system for processing a stream of video content in a resource-efficient manner using a prediction system.
Figure 2:
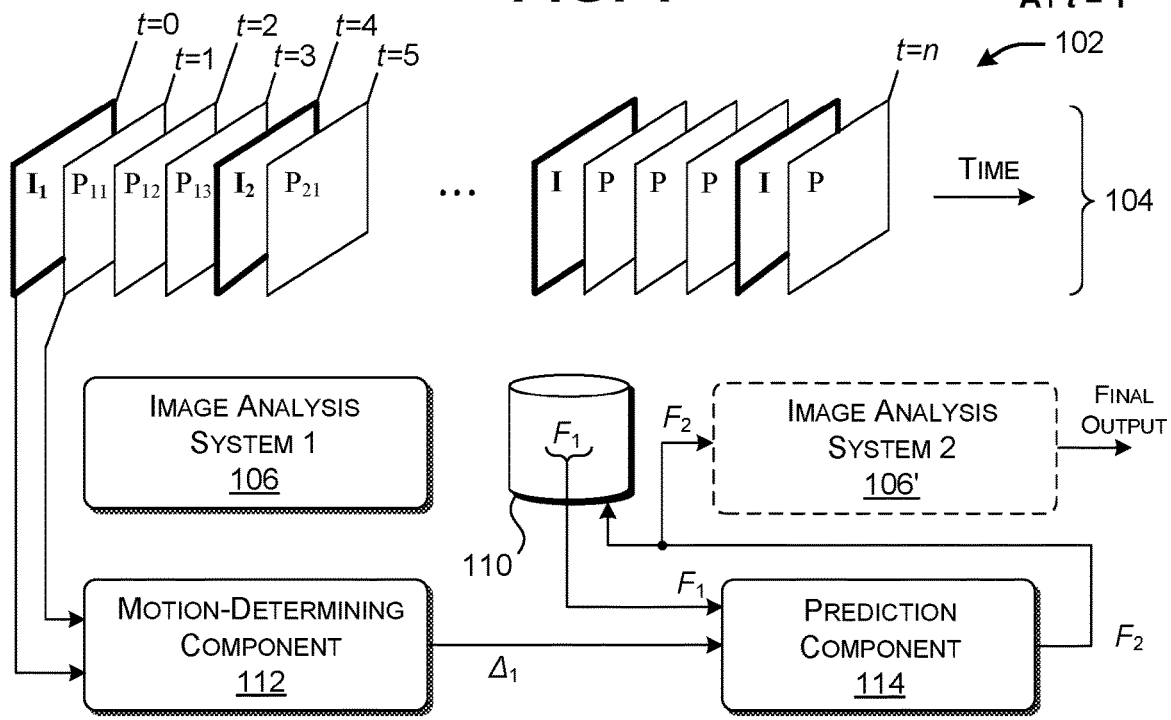
FIGS. 2 and 3 show the operation of the video-processing system at second and third instances of time, respectively.
Figure 3:
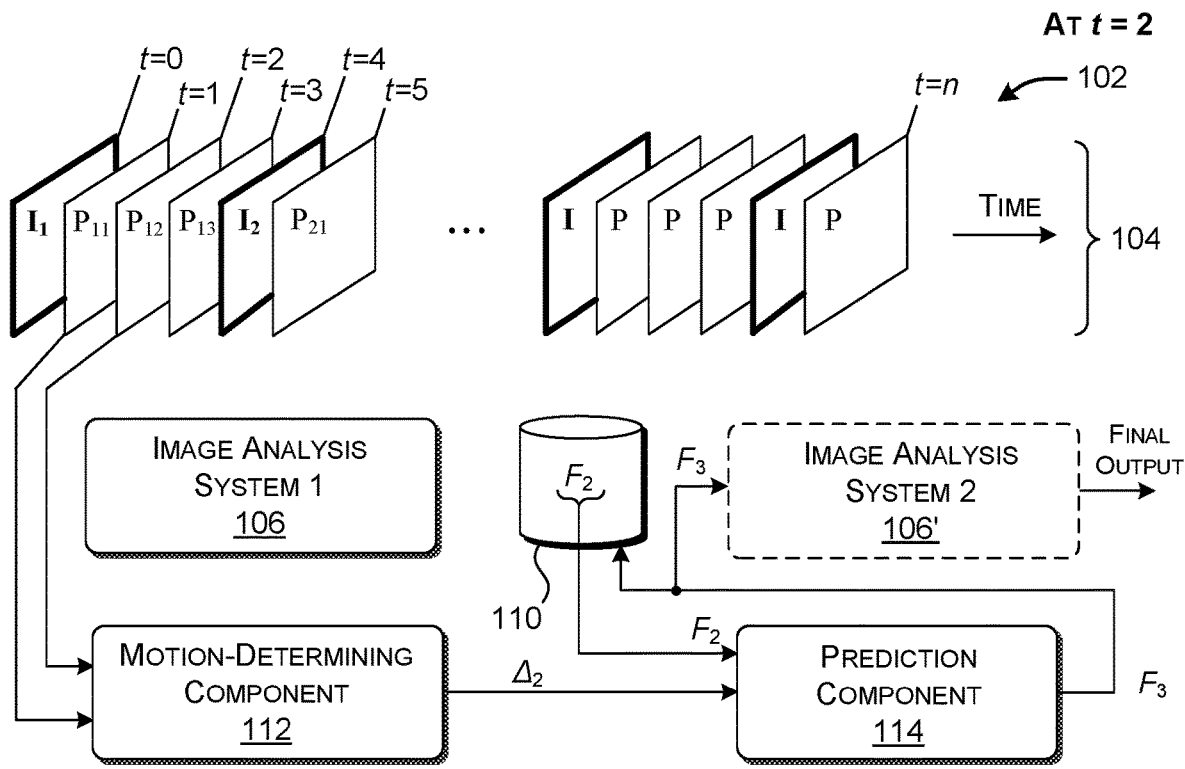

FIG. 1 shows an illustrative video-processing system 102 for processing a stream of video content 104 in a resource-efficient manner using an image analysis system 106 and a prediction system 108. The video content 104 includes a plurality of frames captured at different respective times by any kind of image capture device (such as a camera), or some other kind of image creation device. Each frame represents an image having a specified width (W), height (H), and depth (D). The depth of a frame specifies a number of channels associated with the frame. A red-green-blue (RGB) frame, for instance, is composed of three channels: a first channel for the red component, a second channel for the green component, and a third channel for the blue component. FIG. 1 specifically represents the operation of the video-processing system 102 at a first instance of time (t=0). FIGS. 2 and 3, to be described below, set forth the operation of the video-processing system 102 at a second instance of time (t=1) and a third instance of time (t=2), respectively.

As will be clarified at the end of Section A, other implementations of the principles set forth here can operate on other kinds of data items besides, or in addition to, video items. However, to facilitate explanation, the system 102 will be principally described in the context of the processing of frames of video content.

The video-processing system 102 is configured to interpret some of the frames as key frames (I), and other frames as predicted frames (P). In some implementations, the video-processing system 102 is configured to interpret every fourth frame in the sequence of frames as a key frame, and every frame between neighboring key frames as predicted frames. In the case of FIG. 1, for instance, the video-processing system 102 is configured to interpret the first frame ($I_1$) and the fourth frame ($I_2$) as key frames, and the three frames ($P_{11}$, $P_{12}$, $P_{13}$) between these two neighboring key frames as predicted frames. But other implementations can use other ratios of key frames to predicted frames. For example, other implementations can specify that every seventh frame is a key frame, and the six frames between these neighboring key frames are predicted frames. Note, however, that the source of the frames does not (or need not) attach special significance to any of the frames. The frames are simply images captured at different respective times; it is the video-processing system 102 that interprets each frame as either a key frame or a predicted frame based on a predetermined configuration setting.

The video-processing system 102 uses the image analysis system 106 to process each key frame. The video-processing system 102 uses the prediction system 108 to process each predicted frame. The image analysis system 106 performs a more computationally-intensive process compared to the prediction system 108. That is, the image analysis system 106 performs more floating point operations (FLOPs) for each frame it processes compared to the prediction system 108. The image analysis system 106 further consumes more computing resources for each frame it processes compared to the prediction system 108. The term "computing resources" is intended to encompass processing-related resources, memory-related resources, power, etc. Thus, the video-processing system 102 reduces its overall consumption of computing resources by using the prediction system 108 to process some of the frames, as opposed to using the image analysis system 106 to process all of the frames in the video content 104. This advantage, in turn, can reduce runtime errors in video applications that use the video-processing system 102. It also enables the video-processing system 102 to run on resource-constrained computing platforms, such as handheld devices.

The image analysis system 106 can perform any process-related operations on each frame. For example, the image analysis system 106 can detect an object that appears in the frame. Alternatively, or in addition, the image analysis system 106 can classify video content that appears in the frame, such as by detecting the kind of object that is detected in the frame. Alternatively, or in addition, the image analysis system 106 can enhance the quality of the frame. Alternatively, or in addition, the image analysis system 106 can perform some other transformation of image content in the frame. Still other functions can be performed by the image analysis system 106. Likewise, different video applications can make use of the video-processing system 102. For example, a video conferencing application can incorporate the video-processing system 102.

The image analysis system 106 can be implemented in any manner, such as a feed-forward neural network (FFN), a convolutional neural network (CNN), a transformer-based neural network, a recurrent neural network (RNN), etc., or any combination therefor. Without limitation, two specific examples of image-processing systems that can be used to implement the image analysis system 106 are described in the following co-pending United States patent applications: U.S. Ser. No. 17/164,755, filed on Feb. 1, 2021 to VAEZI JOZE, et al., and entitled "Simultaneously Correcting Image Degradations of Multiple Types in an Image of a Face," and U.S. Ser. No. 17/314,466, filed on May 7, 2021 to VAEZI JOZE, et al., and entitled "Neural Network Target Feature Detection." Other implementations of the image analysis system 106 need not include machine-trained models. That is, these other image analysis systems can include manually-developed image processing algorithms that perform any function(s). For example, one such other image analysis system can use any manually-crafted image filter that transforms each frame from an input form to an output form. The more general point to be made here is this: the video-processing system 102 constitutes an adaptable framework that can speed up the processing performed by any image analysis system 106, regardless of the task(s) the image analysis system 106 was designed to perform and the technology it uses to perform those task(s).

FIG. 1 describes the processing that the video-processing system 102 performs on the key frame $I_1$ at time t=0. The image analysis system 106 receives the key frame to produce first feature information $F_1$. For example, assume that the image analysis system 106 includes a convolutional neural network (CNN) that has plural processing layers. The first feature information $F_1$ may correspond to a feature map produced by a last layer of the CNN. The feature map can have any model-specific size, e.g., corresponding to a vector having any model-specific dimensionality, or a W×H×D array in which the width (W), height (H), and depth (D) can assume any model-specific values. A data store 110 caches the first feature information $F_1$.

In some implementations, the image analysis system 106 represents the entirety of image-processing operations that are performed on the key frame $I_1$. The video-processing system 102 produces its final output results based on the first feature information $F_1$ produced by the image analysis system 106. For example, the final output results can correspond to a quality-enhanced frame, a region-of-interest that identifies a location of a detected object in the frame, a label that identifies a kind of object that appears in the frame, and so on. In other implementations, the image analysis system 106 represents a first-stage component that produces the first feature information $F_1$. Another image analysis system 106' functions as a second-stage component that operates on the first feature information $F_1$, to produce the final output results. In yet other implementations (not shown), the video-processing system 102 includes three or more stages implemented by respective components. As will be described below, the prediction system 108 can be designed to receive input produced by any stage (or stages) of a multi-stage image analysis system. To nevertheless simplify explanation, this disclosure will emphasize the case in which the video-processing system 102 produces its final output results based on the feature information produced by the image analysis system 106.

The image analysis system 106 may be qualified as a "backbone" component because it performs the core image transformations for which the video-processing system 102 was designed. The prediction system 108 is included to improve the efficiency at which these core image transformations are performed across the stream of video content 104, e.g., by extending these transformations to other frames for which the image analysis system 106 is not invoked. The prediction system 108 itself includes a motion-determining component 112 and a prediction component 114. But at time t=0, the prediction system 108 remains idle, meaning that it does not operate on any of the frames.

FIG. 2 shows the operation of the video-processing system 102 at time t=1. At this stage, the goal of the video-processing system 102 is to produce feature information for the first predicted frame $P_{11}$ that follows the first key frame $I_1$. To perform this task, the video-processing system 102 uses the prediction system 108. At this stage, the image analysis system 106 remains idle.

More specifically, the motion-determining component 112 receives the predicted framed $P_{11}$ (for t=1) and the immediately-preceding key frame $I_1$ (for time t=0). The motion-determining component 112 uses a motion-determining model (not shown) to transform these two input frames into first frame-change information $\Delta_1$. The first frame-change information $\Delta_1$ expresses the change in video content that occurs from the key frame $I_1$ to the predicted frame $P_{11}$. More generally stated, at any given time, the motion-determining component 122 receives a pair composed of two temporally-consecutive frames. The motion-determining component 122 uses its motion-determining model to transform these two input frames into frame-change information that expresses the change in video content that occurs in advancing from the first frame to the second frame.

The prediction component 114 receives as input the first frame-change information $\Delta_1$, together with the last-cached feature information in the data store 110. At this time, the last-cached feature information is the first feature information $F_1$ that was produced at time t=0 in FIG. 1. The prediction component 114 uses a prediction model (not shown) to map these two instances of input information ($\Delta_1$, $F_1$) into second feature information $F_2$. The video-processing system 102 stores the second feature information $F_2$ in the data store 110, where it assumes the role of the last-cached instance of feature information. In some cases, the video-processing system 102 produces its final output results based on the second feature information $F_2$. In other implementations, the video-processing system 102 feeds the second feature information $F_2$ to the second-stage image analysis system 106'. Here, the video-processing system 102 produces its final output results based on the output of the image analysis system 106'.

FIG. 3 shows the operation of the video-processing system 102 at time t=2. At this stage, the goal of the video-processing system 102 is to produce feature information for the second predicted frame $P_{12}$ that follows the first predicted frame $P_{12}$. To perform this task, the video-processing system 102 again uses the prediction system 108. The image analysis system 106 continues to remains idle.

More specifically, the motion-determining component 112 receives the predicted framed $P_{12}$ (for t=2) and the immediately-preceding predicted frame $P_{11}$ (for time t=1). The motion-determining component 112 uses its motion-determining model (not shown) to transform these two input frames into second frame-change information $\Delta_2$. The second frame-change information $\Delta_2$ expresses the change in video content that occurs from the first predicted frame $P_{11}$ to the second predicted frame $P_{12}$.

The prediction component 114 receives as input the second frame-change information $\Delta_2$, together with the last-cached feature information in the data store 110. At this time, the last-cached feature information is the second feature information $F_2$ that was produced at time t=1 in FIG. 2. The prediction component 114 uses a prediction model (not shown) to map these two instances of input information ($\Delta_2$, $F_2$) into third feature information $F_3$. The video-processing system 102 stores the third feature information $F_3$ in the data store 110, where it assumes the role of the last-cached instance of feature information. In some cases, the video-processing system 102 produces its final output results based on the third feature information $F_3$. In other implementations, the video-processing system 102 feeds the third feature information $F_3$ to the second-stage image analysis system 106'. Here, the video-processing system produces its final output results based on the output of the image analysis system 106'.

The video-processing system 102 continues processing each frame of the stream of video content 104 in the above-described manner. That is, each time that the video-processing system 102 encounters a key frame, it performs the processing summarized in FIG. 1. Each time that the video-processing system 102 encounters a predicted frame, it performs the processing summarized in FIGS. 2 and 3. In this manner, the video-processing system 102 switches between use of the image analysis system 106 and the prediction system 108 based on a ratio specified by a configuration parameter of the video-processing system 102. The prediction system 108 may be viewed as extending the results generated by the image analysis system 106 to frames which follow a key frame, without incurring the computationally-expensive operations performed by the image analysis system 106 for each of those subsequent frames.

In a variation of the operation described above, the image analysis system 106 can include at least a first image analysis part and a second image analysis part. The prediction system 108 can include a first prediction component that computes feature information for the first image analysis part, and a second prediction component that computes feature information for the second image analysis part. In other words, the prediction system 108 can speed up the processing performed by plural parts of the image analysis system 106.

Figure 4:
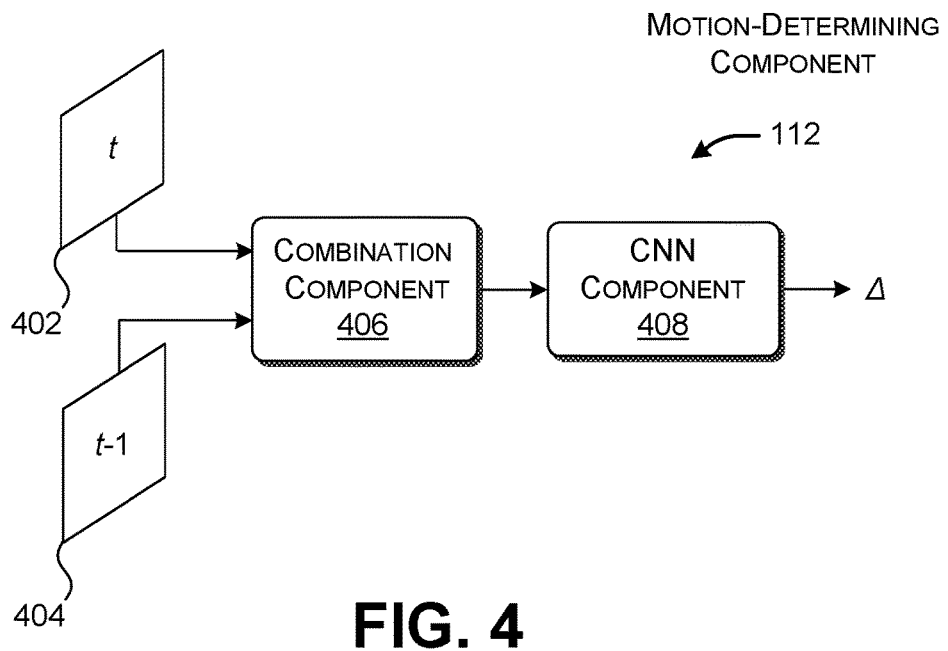
FIG. 4 shows one implementation of a motion-determining component, which is part of the prediction system of FIGS. 1-3.

FIG. 4 shows one implementation of the motion-determining component 112. The motion-determining component 112 receives a pair of consecutive frames (402, 404) that occur at time t and time t−1, respectively. A combination component 406 combines the two frames (402, 404) to produce image pair information. For example, the combination component 406 can concatenate the two frames (402, 406) to produce the image pair information. A convolutional neural network (CNN) component 408 maps the image pair information into the frame-change information $\Delta$. The frame-change information $\Delta$ expresses the change in video content that occurs from the first frame 402 to the second frame 404.

Figure 5:
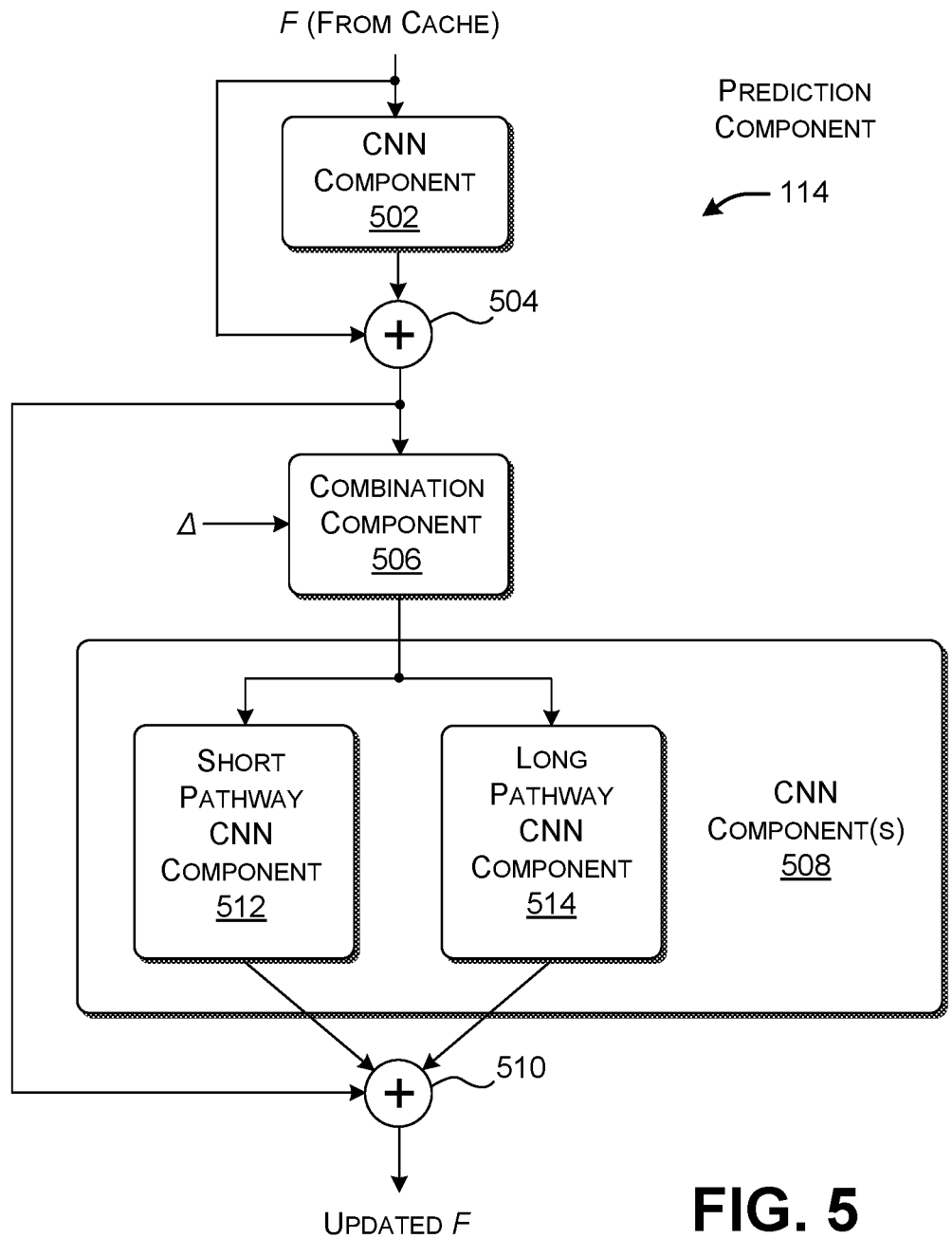
FIG. 5 shows one implementation of a prediction component, which is another part of the prediction system of FIGS. 1-3.

FIG. 5 shows one implementation of the prediction component 114. The prediction component 114 uses a preliminary CNN component 502 to transform the last-cached feature information (which it pulls from the data store 110) into output information. The prediction component 114 uses a residual connection 504 to combine the input information fed to the preliminary CNN component 502 with the output information that it produces, to yield modified output information. That is, if the input information fed to the CNN component 502 is x, and the transformation performed by the CNN component 502 is g(x), then the residual connection 504 produces modified output information in the form of x+g(x). The prediction component 114 then uses a combination component 506 (e.g., a concatenation component) to combine the modified output information with the current frame-change information Δ. This produces merged information.

The prediction component 114 next uses another CNN component 508 to transform the merged information into output information. It then uses another residual connection 510 to combine the input information fed to the combination component 506 with the output information produced by the CNN component 508, to produce feature information F.

In some implementations, the CNN component 508 can produce its output information using two or more sub-CNNs (512, 514, . . . ) that use different kernel sizes. As will be described below, the size of a kernel in a convolution operation determines the scope of input information that is taken into account when computing each part of the output information produced by the convolution operation. Thus, by using different sub-CNNs (512, 514, . . . ) that use different kernel sizes, the prediction component 114 can produce analyses having different informational scopes. In the specific example of FIG. 6, the prediction component 114 uses a short pathway CNN component 512 that uses a kernel size of 1×1 in its convolutional layers. The prediction component 114 uses a long pathway CNN component 514 that uses a kernel size of 3×3 in its convolutional layers. The residual connection 510 can perform elementwise combination of the input fed to the combination component 506, the output of the short pathway CNN component 512, and output of the long pathway CNN component 514.

Figure 6:
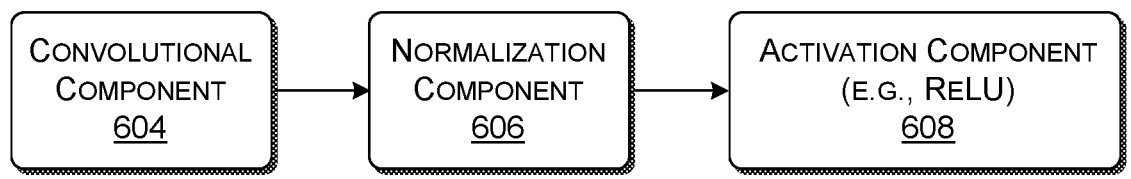
FIG. 6 shows one implementation of a convolutional neural network (CNN) block, which is a processing component that may be used to build the motion-determining component of FIG. 4 and/or the prediction component of FIG. 5.

The CNN components used by the motion-determining component 112 and the prediction component 114 can each include a pipeline of one or more convolutional neural network (CNN) blocks. FIG. 6 shows one non-limiting implementation of an individual CNN block 602. The CNN block 602 includes a convolutional component 604 that performs a convolution operation on input information that is fed to the convolutional component 604. To perform a convolution operation, the convolutional component 604 moves a kernel of predetermined size across the input information in predetermined increments. At each position of the kernel, the convolutional component 604 forms the dot product of the values in the kernel with the values in a section of the input information that is demarcated by the kernel at its current position. The dot product at this position represents part of the output information produced by the convolutional component 604. One particular kind of convolution operation that can be used is the well-known depthwise convolution operation, which performs depthwise convolution followed by pointwise convolution. This combination of convolution operations increases the efficiency of the overall convolution operation.

A normalization component 606 normalizes the output information produced by the convolutional component 604. For example, the normalization component 606 can perform group normalization by computing the mean (μ) and standard deviation (σ) of values within at least part of the output information produced by the convolutional component 604. It can then correct each value $x_i$ based on the mean and standard deviation (e.g., $\hat{x}_i = (x_i - \mu)/\sqrt{\sigma}$).

An activation component 608 applies any type of activation function to the output information produced by the normalization component 606. One illustrative activation function is the Rectiliner Linear Unit (ReLU). The ReLU function transforms an input x as follows: f(x)=x for values of x greater than 0, and zero otherwise. A Leaky ReLU function produces a small non-zero output value (e.g., 0.01x), instead of zero, for values of x that that are not greater than zero.

Figure 7:
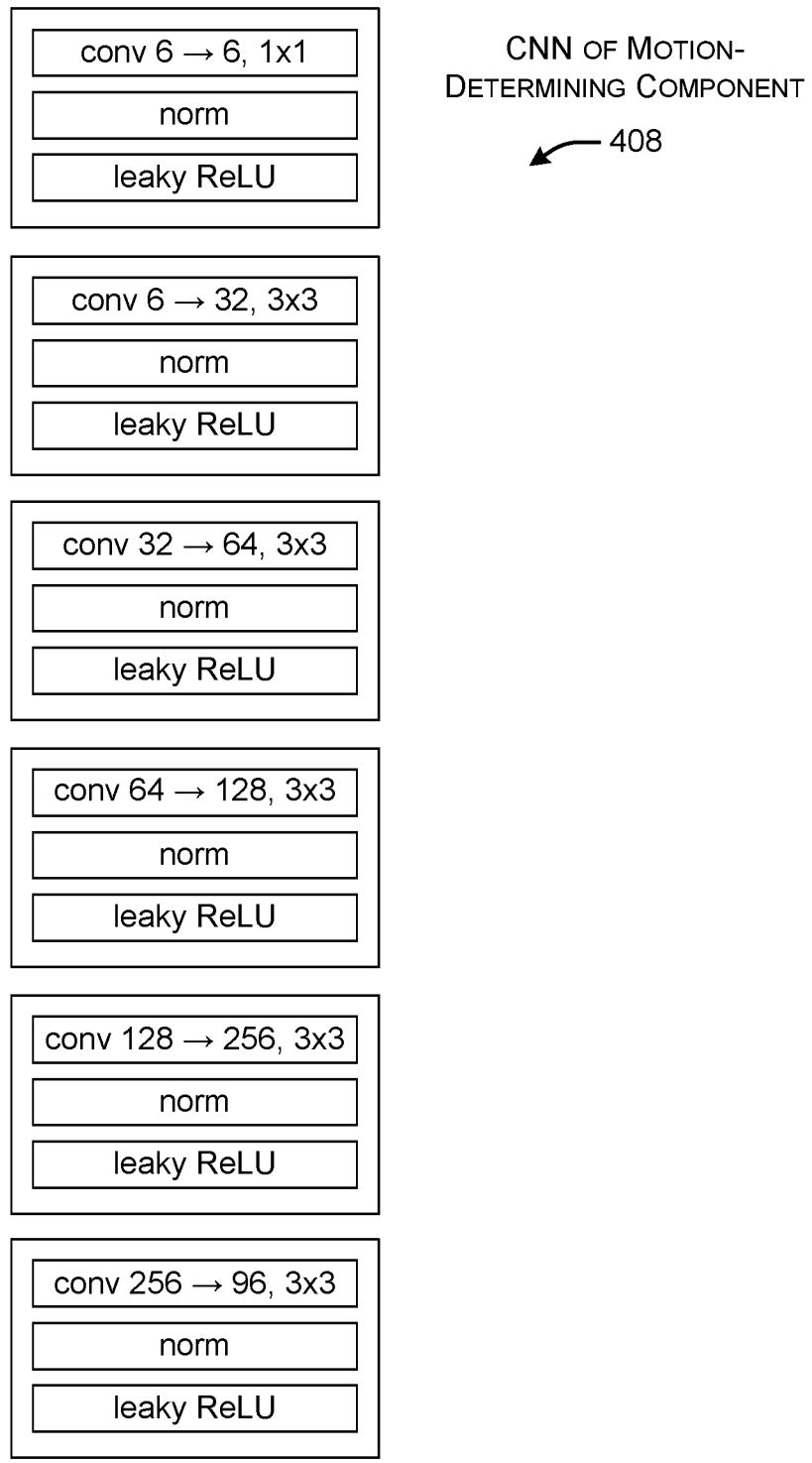
FIG. 7 shows one non-limiting implementation of part of the motion-determining component of FIG. 4.

FIG. 7 shows one non-limiting implementation of the CNN component 408 used in the motion-determining component 112. It includes six CNN blocks of type described in FIG. 6. For instance, consider the third convolutional component of the third CNN block. It bears the notation: "conv 32→64, 3×3". This means that the convolution operation converts input information having 32 channels into output information having 64 channels using a filter size of 3×3.

Figure 8:
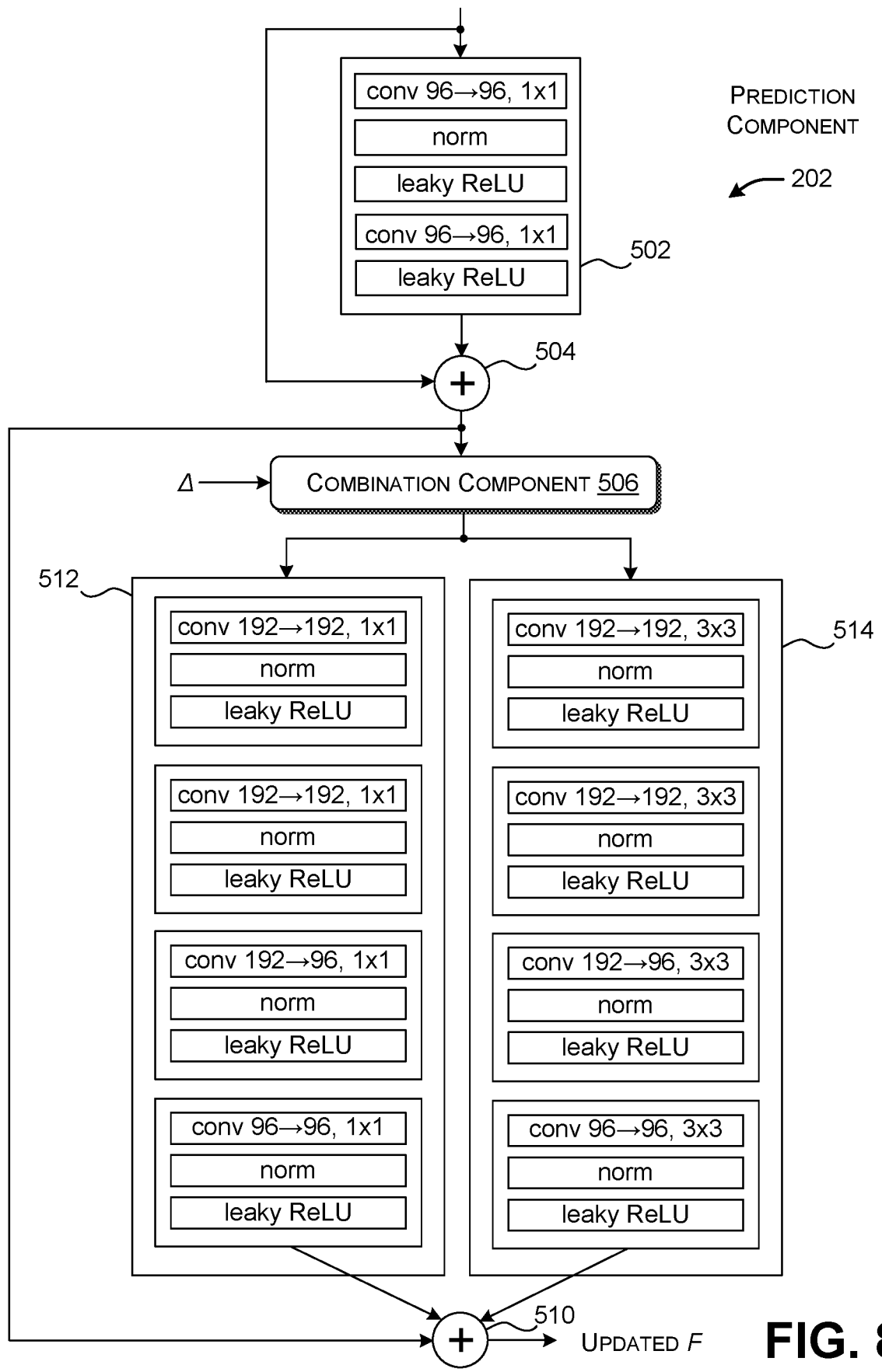
FIG. 8 shows one non-limiting implementation of the prediction component of FIG. 5.

FIG. 8 shows one implementation of the prediction component 114 shown in FIG. 5. The preliminary CNN component 502 includes a CNN block followed by a convolutional component and a Leaky ReLU component. The short pathway CNN component 512 includes four CNN blocks that use a kernel size of 1×1. The long pathway CNN component 514 includes four CNN blocks that use a kernel size of 3×3.

Other implementations can vary the details shown in FIGS. 7 and 8 in different ways. For example, other implementations can vary the number of CNN blocks used, the architecture of the CNN components, the kernel sizes, etc. Alternatively, or in addition, other implementations can use different types of neural network architectures. For example, other implementations can use a transformer-based neural network to implement the motion-determining component 112 and/or the prediction component 114.

Figure 9:
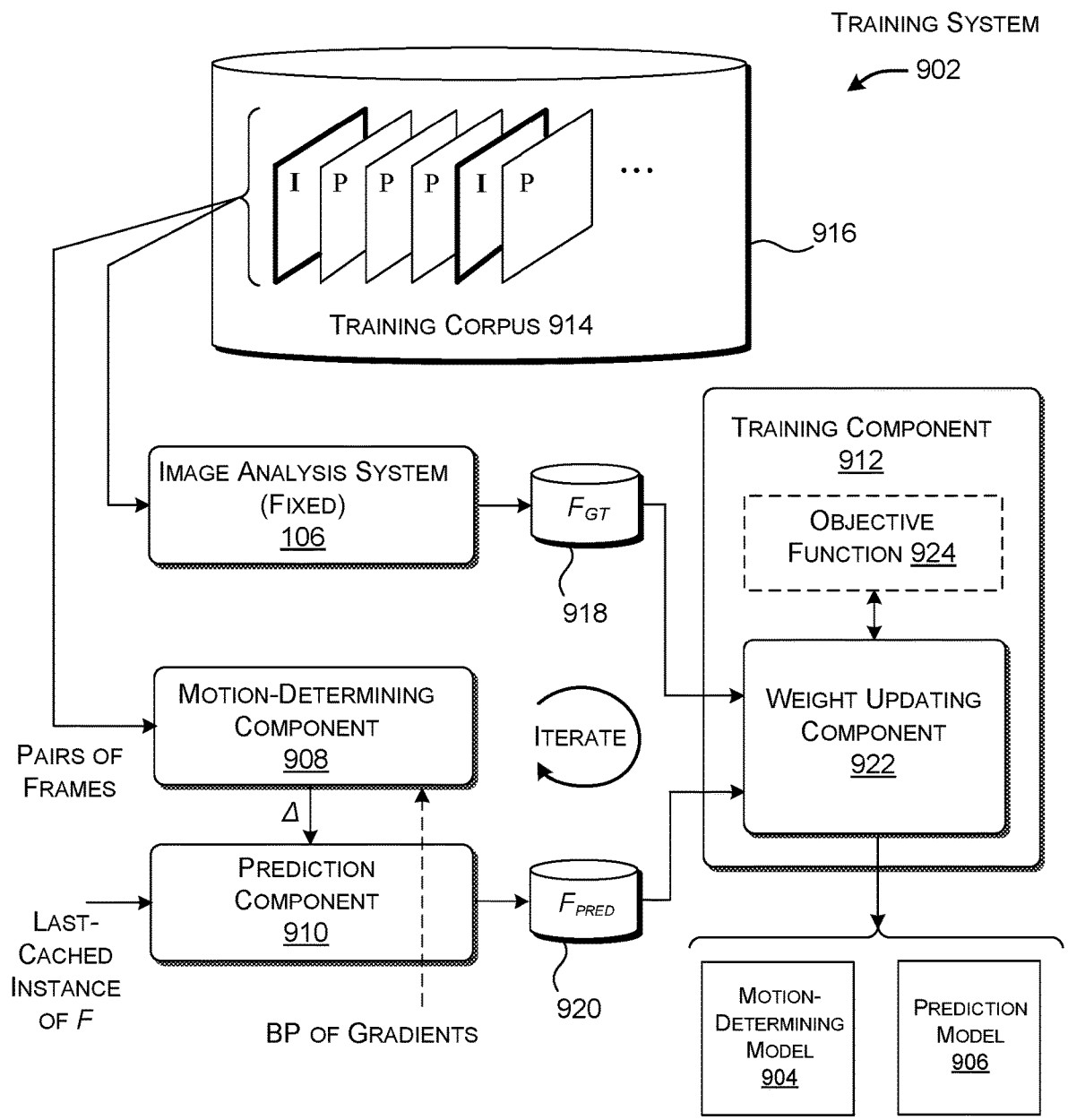
FIG. 9 shows one implementation of a training system that can be used to train a motion-determining model for use in the motion-determining component of FIG. 4, and a prediction model for use in the prediction component of FIG. 5.

FIG. 9 shows one implementation of a training system 902 that can be used to train a motion-determining model 904 for use in the motion-determining component 112 of FIG. 4, and a prediction model 906 for use in the prediction component 114 of FIG. 5. The training system 902 operates on the basis of the fully-trained image analysis system 106. The training system 902 also operates on a motion-determining component 908, which is the training-stage counterpart of the motion-determining component 112 shown in FIG. 4, and a prediction component 910, which is the training-stage counterpart of the prediction component 114 shown in FIG. 5. A training component 912 successively updates the weights of the models (904, 906) in a manner described below. The training component 912 does not affect the weights of the image analysis system 106, which, as said, is already fully trained.

The training system 902 operates on a sequence of video frames in a training corpus 914, provided in a data store 916. More specifically, the image analysis system 106 transforms each frame of the training corpus 914 into an instance of ground-truth feature information $F_{GT}$. The feature information is referred to as ground-truth feature information because it can be considered by default as the correct feature information for the frame under consideration (since, again, the image analysis system 106 is fully trained). To be more explicit, the image analysis system 106 performs its operation on every frame of the training corpus 914, not just for certain frames that are interpreted as key frames. The image analysis system 106 stores the instances of ground-truth feature information in a data store 918.

The prediction component 910 transforms each frame in the training corpus 914 that is interpreted as a predicted frame into an instance of predicted feature information $F_{PRED}$. The prediction component 910 performs this task in the same manner described above with respect to FIGS. 2 and 3. That is, for each predicted frame, the prediction component 114 maps frame-change information Δ (received from the motion-determining component 908) and the last-cached instance of feature information $F_{t-1}$ to updated feature information $F_t$. The last-cached instance of feature information $F_{t-1}$ is computed by either the image analysis system 106 or the prediction component 910, depending on whether the frame at t−1 is a key frame or a predicted frame. The motion-determining component 908 computes the frame-change information Δ based on the current predicted frame (at time t) and its immediately-preceding frame (at time t−1). The training system 902 stores the instances of predicted frame information in a data store 920.

An updating component 922 computes loss for each predicted frame in a manner specified by an objective function 924. For example, the updating component 922 can compute the loss for a predicted frame based on the L2 distance between the feature information predicted for this frame by the prediction component 910 and the ground-truth feature information computed for this frame by the image analysis system 106. The updating component 922 can compute gradients based on a plurality of loss measures for a plurality of predicted frames in a batch, and can then adjust the weights of the models (904, 906) by backpropagating these gradients through the prediction component 910 and the motion-determining component 908. Once again, the training system 902 leaves the weights of the image analysis system 106 unmodified. Further note that the training system 902 does not calculate loss information for frames that are interpreted as key frames. The training system 902 repeats the above operations for one or more batches of training examples until a prescribed training objective is achieved.

The training process described above is advantageous because it can be applied to any image analysis system 106. Further, the training process provides a resource-efficient and time-efficient way of producing ground-truth feature information. For example, the training process avoids the need for a developer to manually define the ground-truth feature information.

Other implementations of the technology described herein can be applied to other data items that are composed of a series of parts. For example, other implementations can use the prediction system 108 to expedite the analysis of any temporal series of measurements obtained from any source(s). For instance, a depth-sensing device (e.g., the KINECT device produced by MICROSOFT CORPORATION of Redmond, Wash.) can generate a stream of position information that expresses the position of a user's body at different respective times. The prediction system 108 can expedite the processing of this position information. Other implementations can use the prediction system 108 to analyze a temporal series of model data instances (e.g., describing characters in a virtual world), a temporal series of audio data items, and so on.

In view thereof, the video-processing system 102 can be recast as a "system." The image analysis system 106 can be recast as an "analysis system." Each frame of video content more generally corresponds to a "part" of a "data item" that is composed of a series of parts. The frame-change information can be recast as "part-change information." All of the principles set forth above in the context the video-processing system 102 apply to the more generic system that operates on a data item composed of a series of parts.

B. Illustrative Processes

Figure 11:
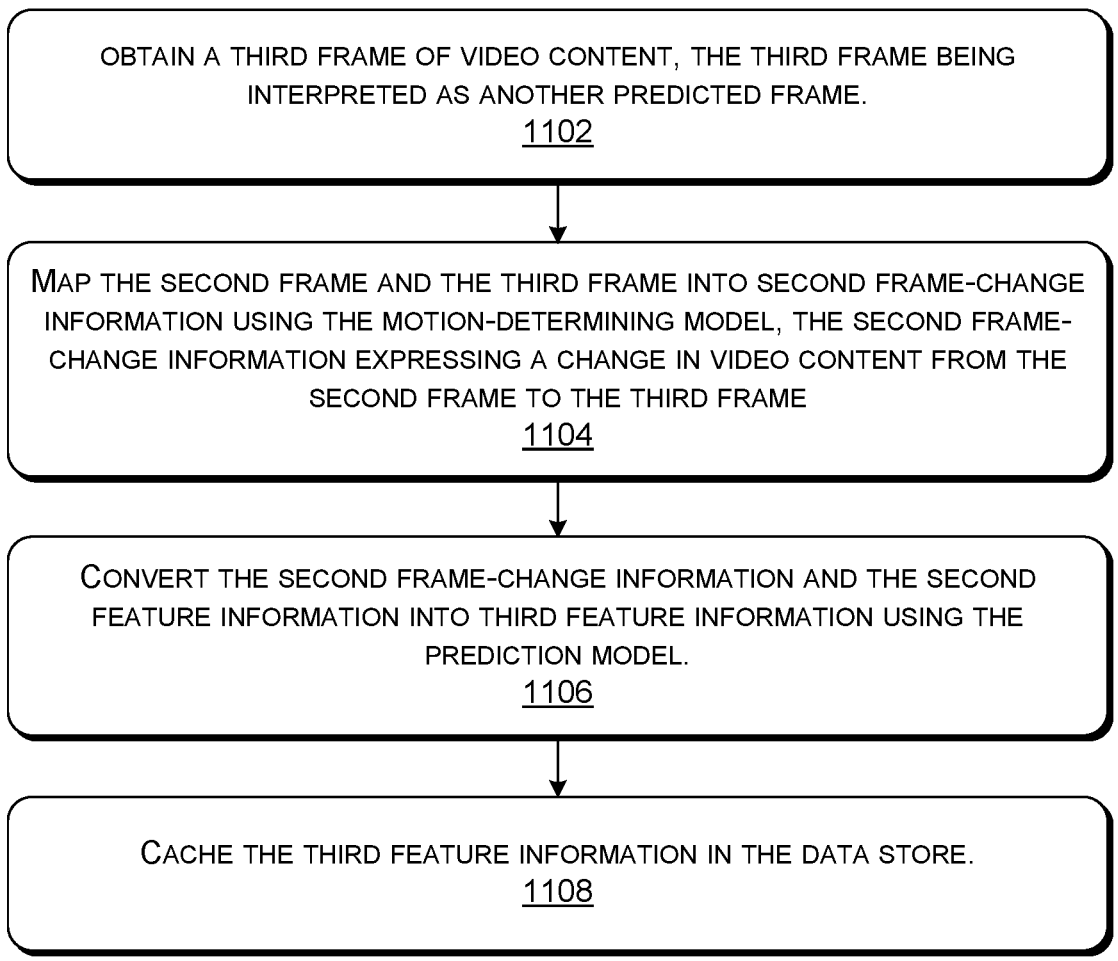

FIGS. 10 and 11 show a process 1002 that explains one manner of operation of the video-processing system 102 described in Section A in flowchart form. Since the principles underlying the video-processing system 102 have already been described in Section A, certain operations will be addressed in summary fashion in this section. Each flowchart is expressed as a series of operations performed in a particular order. But the order of these operations is merely representative, and can be varied in other implementations. Further, any two or more operations described below can be performed in a parallel manner. In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

In block 1004 of FIG. 10, the video-processing system 102 obtains a first frame of video content, the first frame being interpreted as a key frame. In block 1006, the video-processing system 102 converts the first frame into first feature information $F_1$ using the image analysis system 106. In block 1008, the video-processing system 102 caches the first feature information $F_1$ in the data store 110. In block 1010, the video-processing system 102 obtains a second frame of video content, the second frame being interpreted as a predicted frame. In block 1012, the video-processing system 102 maps the first frame and the second frame into first frame-change information $\Delta_1$ using the motion-determining model 904, the first frame-change information $\Delta_1$ expressing a change in video content from the first frame to the second frame. In block 1014, the video-processing system 102 converts the first frame-change information $\Delta_1$ and the first feature information $F_1$ into second feature information $F_2$ using the prediction model 906. In block 1016, the video-processing system 102 caches the second feature information $F_3$ in the data store 110.

Advancing to FIG. 11, in block 1102, the video-processing system 102 obtains a third frame of video content, the third frame being interpreted as another predicted frame. In block 1104, the video-processing system 102 maps the second frame and the third frame into second frame-change information $\Delta_2$ using the motion-determining model 904, the second frame-change information $\Delta_2$ expressing a change in video content from the second frame to the third frame. In block 1106, the video-processing system 102 converts the second frame-change information $\Delta_2$ and the second feature information $F_2$ into third feature information $F_3$ using the prediction model 906. In block 1108, the video-processing system 102, caches the third feature information $F_3$ in the data store 110.

The video-processing system 102 repeats the analyses described above for the remaining frames in a stream of video content 104. If the frame under consideration at a particular time is a key frame, the video-processing system 102 uses the process of FIG. 10. If the frame under consideration is a predicted frame, the video-processing system 102 uses the process of FIG. 11.

The process 1002 of FIG. 2 can be extended to other kinds of data items besides video content. In that more general context, the process 1002 can be recast as follows. In block 1004, a system obtains a first part of a data item, the first part being interpreted as a key part. In block 1006, system converts the first part into first feature information $F_1$ using an analysis system. In block 1008, the system caches the first feature information $F_1$ in the data store 110. In block 1010, the system obtains a second part of the data item, the second part being interpreted as a predicted part. In block 1012, the system maps the first part and the second part into first part-change information $\Delta_1$ using the motion-determining model 904, the first part-change information $\Delta_1$ expressing a change in the data item from the first frame to the second frame. In block 1014, the system converts the first part-change information $\Delta_1$ and the first feature information $F_1$ into second feature information $F_2$ using the prediction model 906. In block 1016, the system caches the second feature information $F_3$ in the data store 110.

C. Representative Computing Functionality

Figure 12:
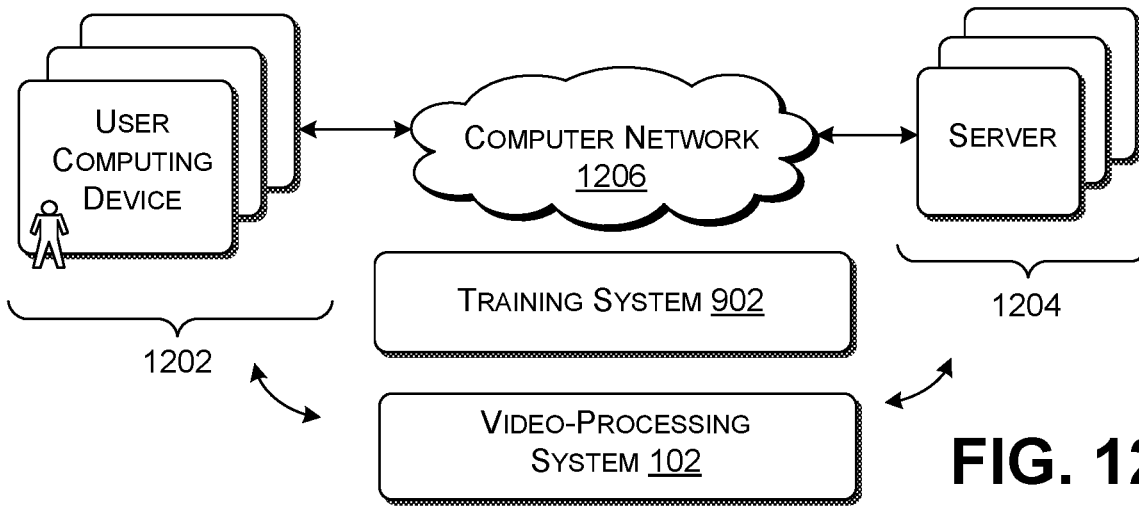
FIG. 12 shows computing equipment that can be used to implement the systems shown in FIG. 1.

FIG. 12 shows an example of computing equipment that can be used to implement any of the systems summarized above. The computing equipment includes a set of user computing devices 1202 coupled to a set of servers 1204 via a computer network 1206. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, and so on. The computer network 1206 can be implemented as a local area network, a wide area network (e.g., the Internet), one or more point-to-point links, or any combination thereof.

FIG. 12 also indicates that the video-processing system 102 and the training system 902 can be spread across the user computing devices 1202 and/or the servers 1204 in any manner. For instance, in one case, the video-processing system 102 is entirely implemented by one or more of the servers 1204. Each user may interact with the servers 1204 via a user computing device. In another case, the video-processing system 102 is entirely implemented by a user computing device in local fashion, in which case no interaction with the servers 1204 is necessary. In another case, the functionality associated with the video-processing system 102 is distributed between the servers 1204 and each user computing device in any manner.

Figure 13:
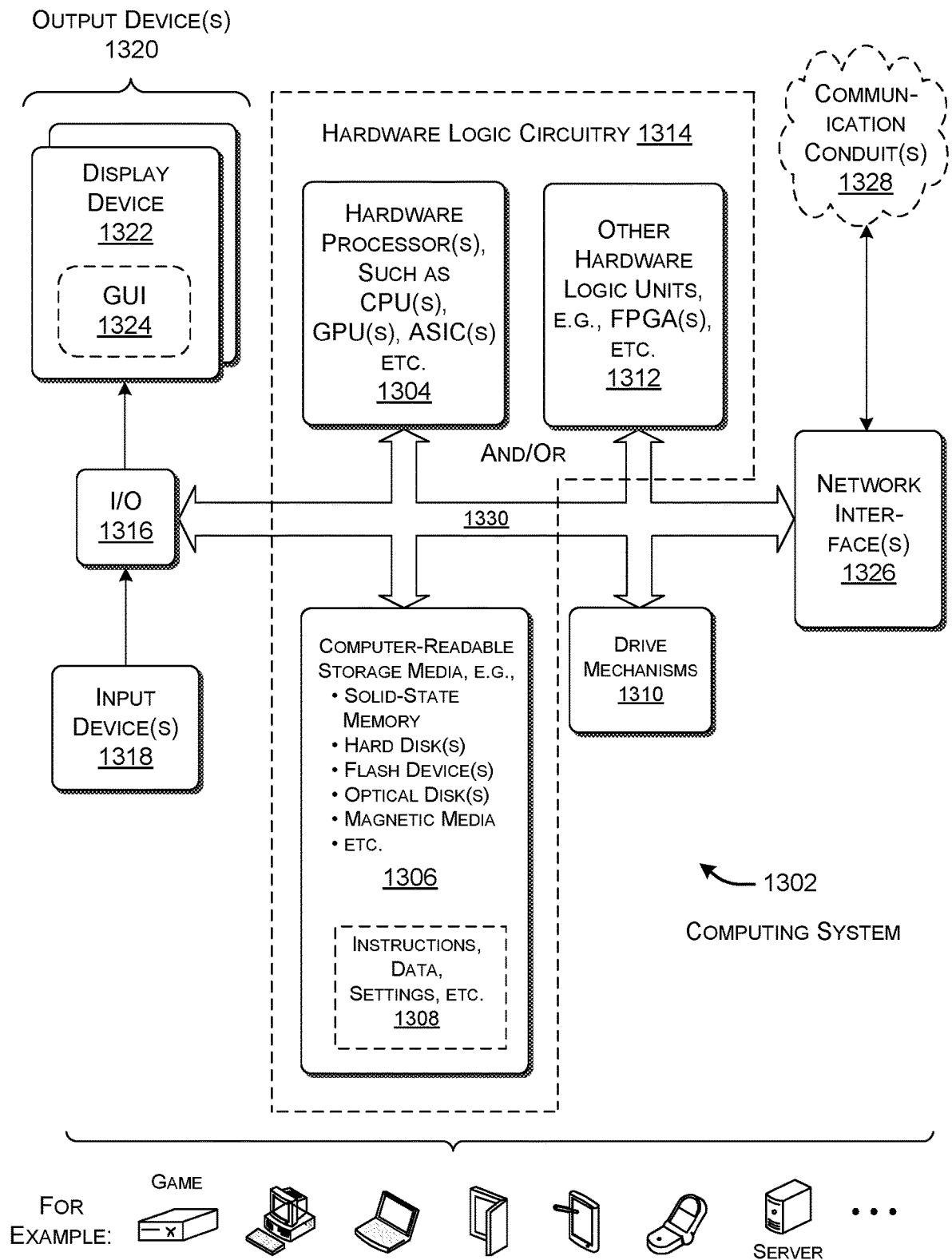
FIG. 13 shows an illustrative type of computing system that can be used to implement any aspect of the features shown in the foregoing drawings.

FIG. 13 shows a computing system 1302 that can be used to implement any aspect of the mechanisms set forth in the above-described figures. For instance, the type of computing system 1302 shown in FIG. 13 can be used to implement any user computing device or any server shown in FIG. 12. In all cases, the computing system 1302 represents a physical and tangible processing mechanism.

The computing system 1302 can include one or more hardware processors 1304. The hardware processor(s) 1304 can include, without limitation, one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any hardware processor can correspond to a general-purpose processing unit or an application-specific processor unit.

The computing system 1302 can also include computer-readable storage media 1306, corresponding to one or more computer-readable media hardware units. The computer-readable storage media 1306 retains any kind of information 1308, such as machine-readable instructions, settings, data, etc. Without limitation, the computer-readable storage media 1306 may include one or more solid-state devices, one or more magnetic hard disks, one or more optical disks, magnetic tape, and so on. Any instance of the computer-readable storage media 1306 can use any technology for storing and retrieving information. Further, any instance of the computer-readable storage media 1306 may represent a fixed or removable unit of the computing system 1302. Further, any instance of the computer-readable storage media 1306 may provide volatile or non-volatile retention of information.

More generally, any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media.

The computing system 1302 can utilize any instance of the computer-readable storage media 1306 in different ways. For example, any instance of the computer-readable storage media 1306 may represent a hardware memory unit (such as Random Access Memory (RAM)) for storing transient information during execution of a program by the computing system 1302, and/or a hardware storage unit (such as a hard disk) for retaining/archiving information on a more permanent basis. In the latter case, the computing system 1302 also includes one or more drive mechanisms 1310 (such as a hard drive mechanism) for storing and retrieving information from an instance of the computer-readable storage media 1306.

The computing system 1302 may perform any of the functions described above when the hardware processor(s) 1304 carry out computer-readable instructions stored in any instance of the computer-readable storage media 1306. For instance, the computing system 1302 may carry out computer-readable instructions to perform each block of the processes described in Section B.

Alternatively, or in addition, the computing system 1302 may rely on one or more other hardware logic units 1312 to perform operations using a task-specific collection of logic gates. For instance, the hardware logic unit(s) 1312 may include a fixed configuration of hardware logic gates, e.g., that are created and set at the time of manufacture, and thereafter unalterable. Alternatively, or in addition, the other hardware logic unit(s) 1312 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 13 generally indicates that hardware logic circuitry 1314 includes any combination of the hardware processor(s) 1304, the computer-readable storage media 1306, and/or the other hardware logic unit(s) 1312. That is, the computing system 1302 can employ any combination of the hardware processor(s) 1304 that execute machine-readable instructions provided in the computer-readable storage media 1306, and/or one or more other hardware logic unit(s) 1312 that perform operations using a fixed and/or programmable collection of hardware logic gates. More generally stated, the hardware logic circuitry 1314 corresponds to one or more hardware logic units of any type(s) that perform operations based on logic stored in and/or otherwise embodied in the hardware logic unit(s). Further, in some contexts, each of the terms "component," "module," "engine," "system," and "tool" refers to a part of the hardware logic circuitry 1314 that performs a particular function or combination of functions.

In some cases (e.g., in the case in which the computing system 1302 represents a user computing device), the computing system 1302 also includes an input/output interface 1316 for receiving various inputs (via input devices 1318), and for providing various outputs (via output devices 1320). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers, gyroscopes, etc.), and so on. One particular output mechanism may include a display device 1322 and an associated graphical user interface presentation (GUI) 1324. The display device 1322 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing system 1302 can also include one or more network interfaces 1326 for exchanging data with other devices via one or more communication conduits 1328. One or more communication buses 1330 communicatively couple the above-described units together.

The communication conduit(s) 1328 can be implemented in any manner, e.g., by a local area computer network, a wide area computer network (e.g., the Internet), point-to-point connections, etc., or any combination thereof. The communication conduit(s) 1328 can include any combination of hardwired links, wireless links, routers, gateway functionality, name servers, etc., governed by any protocol or combination of protocols.

FIG. 13 shows the computing system 1302 as being composed of a discrete collection of separate units. In some cases, the collection of units corresponds to discrete hardware units provided in a computing device chassis having any form factor. FIG. 13 shows illustrative form factors in its bottom portion. In other cases, the computing system 1302 can include a hardware logic unit that integrates the functions of two or more of the units shown in FIG. 1. For instance, the computing system 1302 can include a system on a chip (SoC or SOC), corresponding to an integrated circuit that combines the functions of two or more of the units shown in FIG. 13.

The following summary provides a non-exhaustive set of illustrative examples of the technology set forth herein.

(A1) According to a first aspect, some implementations of the technology described herein include a method (e.g., the process 1002) for processing a stream of video frames. The method includes: obtaining (e.g., 1004) a first frame of video content, the first frame being interpreted as a key frame; converting (e.g., 1006) the first frame into first feature information using an image analysis system (e.g., 106); caching (e.g., 1008) the first feature information in a data store (e.g., 110); obtaining (e.g., 1010) a second frame of video content, the second frame being interpreted as a predicted frame; mapping (e.g., 1012) the first frame and the second frame into first frame-change information using a motion-determining model (e.g., 904), the first frame-change information expressing a change in video content from the first frame to the second frame; converting (e.g., 1014) the first frame-change information and the first feature information into second feature information using a prediction model (e.g., 906); and caching (e.g., 1016) the second feature information in the data store.

(A2) According some implementations of the method of A1, the method further includes: obtaining a third frame of video content, the third frame being interpreted as another predicted frame; mapping the second frame and the third frame into second frame-change information using the motion-determining model, the second frame-change information expressing a change in video content from the second frame to the third frame; converting the second frame-change information and the second feature information into third feature information using the prediction model; and caching the third feature information in the data store.

(A3) According some implementations of the method of A1, the method further includes: obtaining a third frame of video content, the third frame being interpreted as another key frame; converting the third frame into third feature information using the image analysis system; and caching the third feature information in the data store;

(A4) According some implementations of any of the methods of A1-A3, the method further includes converting each instance of feature information into output information using another image analysis system.

(A5) According some implementations of any of the methods of A1-A4, the image analysis system includes a model that is trained independently of, and prior to, training the motion-determining model and the prediction model.

(A6) According some implementations of any of the methods of A1-A5, the motion-determining model and the prediction model are trained by: using the image analysis system, which has already been trained, to produce instances of ground-truth feature information for a set of video frames; using the motion-determining model and the prediction model to produce instances of predicted feature information for video frames in the set that are interpreted as predicted frames; determining differences between the instances of ground-truth feature information and counterpart instances of predicted feature information; adjusting weights of the motion-determining model and the prediction model to reduce the differences; and repeating the operation of using the image analysis system, the operation of using the motion-determining model and the prediction model, the operation of determining the differences, and the operation of adjusting weights plural times until a training objective is achieved.

(A7) According some implementations of any of the methods of A1-A6, the image analysis system is implemented, at least in part, using a neural network.

(A8) According some implementations of any of the methods of A1-A7, the motion-determining model is implemented, at least in part, by a convolutional neural network.

(A9) According some implementations of any of the methods of A1-A8, the prediction model is implemented, at least in part, by a convolutional neural network.

(A10) According some implementations of the method of A9, the convolutional neural network of the prediction model includes a first path neural network that uses a first kernel size and a second path neural network that uses a second kernel size, wherein the second kernel size is larger than the first kernel size.

(A11) According some implementations of the method of A9, the convolutional neural network of the prediction model operates by: mapping the first feature information obtained from the data store into intermediary information using a first convolutional neural network; combining the intermediary information with the first frame-change information to produce combined information; and mapping the combined information into the second feature information using another convolutional neural network.

(B1) According to a second aspect, some implementations of the technology described herein include a method (e.g., the process 1002) for processing a data item. The method includes: obtaining (e.g., 1004) a first part of the data item having a sequence of parts, the first part being interpreted as a key part; converting (e.g., 1006) the first part into first feature information using a data item analysis process; caching (e.g., 1008) the first feature information in a data store (e.g., 110); obtaining (e.g., 1010) a second part of the data item, the second part being interpreted as a predicted part; mapping (e.g., 1012) the first part and the second part into first part-change information using a motion-determining model (e.g., 904), the first part-change information expressing a change in the data item from the first part to the second part; converting (e.g., 1014) the first part-change information and the first feature information into second feature information using a prediction model (e.g., 906); and caching (e.g., 1016) the second feature information in the data store.

(B2) According some implementations of the method of B1, the data item is video content, and the first part and the second part are respectively a first frame and a second frame of the video content.

In yet another aspect, some implementations of the technology described herein include a computing system (e.g., computing system 1302). The computing system includes hardware logic circuitry (e.g., 1314) that is configured to perform any of the methods described herein (e.g., any individual method of the methods A1-A11 and B1-B2).

In yet another aspect, some implementations of the technology described herein include a computer-readable storage medium (e.g., 1306) for storing computer-readable instructions (e.g., 1308). The computer-readable instructions, when executed by one or more hardware processors (e.g., 1304), perform any of the methods described herein (e.g., any individual method of the methods A1-A11 and B1-B2). The computer-readable instructions can also implement the first attention-based neural network, the second attention-based neural network, and the scoring neural network.

(C1) According to a third aspect, some implementations of the technology described herein includes a computing system (e.g., 102) for processing a stream of video frames. The computing system includes: an image analysis system (e.g., 106) for receiving video frames that are interpreted as key frames, and for converting the key frames into instances of key-frame feature information; a prediction neural network (e.g., 114) for receiving video frames that are interpreted as predicted frames, and for converting the predicted frames, along with instances of frame-change information, into instances of predicted feature information; a data store (e.g., 110) for storing the instances of key-frame feature information produced by the image analysis system and the predicted feature information produced by the prediction neural network; and a motion-determining neural network (e.g., 112) for mapping pairs of consecutive video frames in the stream of video frames into the instances of the frame-change information.

(C2) According some implementations of the computing system of C1, one particular pair of consecutive video frames includes a particular key frame and an immediately-following particular predicted frame.

(C3) According some implementations of the computing system of C1, one particular pair of consecutive video frames includes a first predicted frame and an immediately-following second predicted frame.

(C4) According some implementations of any of the computing systems of C1-C3, the image analysis system is a first image analysis system, and wherein the computing system includes a second image analysis system for converting the instances of the key-frame feature information and the instances of the predicted feature information into instances of output information.

(C5) According some implementations of any of the computing systems of C1-C4, the motion-determining neural network includes, at least in part, a convolutional neural network.

(C6) According some implementations of any of the computing systems of C1-C5, the prediction neural network includes, at least in part, a convolutional neural network.

(C7) According some implementations of the computing system of C6, the convolutional neural network of the prediction neural network includes a first path neural network that uses a first kernel size and a second path neural network that uses a second kernel size, wherein the second kernel size is larger than the first kernel size.

More generally stated, any of the individual elements and steps described herein can be combined, without limitation, into any logically consistent permutation or subset. Further, any such combination can be manifested, without limitation, as a method, device, system, computer-readable storage medium, data structure, article of manufacture, graphical user interface presentation, etc. The technology can also be expressed as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms can be configured to perform an operation using the hardware logic circuitry 1314 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. Finally, the terms "exemplary" or "illustrative" refer to one implementation among potentially many implementations.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing a stream of video frames, comprising:
    obtaining a first frame of video content, the first frame being interpreted as a key frame;
    converting the first frame into first feature information using an image analysis system;
    caching the first feature information in a data store;
    obtaining a second frame of video content, the second frame being interpreted as a predicted frame;
    mapping the first frame and the second frame into first frame-change information using a motion-determining model, the first frame-change information expressing a change in video content from the first frame to the second frame;
    converting the first frame-change information and the first feature information into second feature information using a prediction model; and
    caching the second feature information in the data store,
    the method interpreting every nth frame in the stream of video frames as a key frame, and frames between neighboring key frames as predicted frames, n being specified by a configuration parameter, and
    the method switching between use of the image analysis system and use of the motion-determining model and the prediction model depending on whether a key frame is encountered or a predicted frame is encountered in the stream of video frames.

2. The method of claim 1, further comprising:
    obtaining a third frame of video content, the third frame being interpreted as another predicted frame;
    mapping the second frame and the third frame into second frame-change information using the motion-determining model, the second frame-change information expressing a change in video content from the second frame to the third frame;
    converting the second frame-change information and the second feature information into third feature information using the prediction model; and
    caching the third feature information in the data store.

3. The method of claim 1, further comprising:
    obtaining a third frame of video content, the third frame being interpreted as another key frame;
    converting the third frame into third feature information using the image analysis system; and
    caching the third feature information in the data store.

4. The method of claim 1, further comprising converting each instance of feature information into output information using another image analysis system.

5. The method of claim 1, wherein the image analysis system includes a model that is trained independently of, and prior to, training the motion-determining model and the prediction model.

6. The method of claim 1, wherein the motion-determining model and the prediction model are trained by:
    using the image analysis system, which has already been trained, to produce instances of ground-truth feature information for a set of video frames;
    using the motion-determining model and the prediction model to produce instances of predicted feature information for video frames in the set that are interpreted as predicted frames;
    determining differences between the instances of ground-truth feature information and counterpart instances of predicted feature information;
    adjusting weights of the motion-determining model and the prediction model to reduce the differences; and
    repeating said using the image analysis system, said using the motion-determining model and the prediction model, said determining the differences, and said adjusting weights plural times until a training objective is achieved.

7. The method of claim 1, wherein the motion-determining model is implemented, at least in part, by a convolutional neural network.

8. The method of claim 1, wherein the prediction model is implemented, at least in part, by a convolutional neural network.

9. The method of claim 8, wherein the convolutional neural network of the prediction model includes a first path neural network that uses a first kernel size and a second path neural network that uses a second kernel size for processing last-cached feature information, wherein the second kernel size is larger than the first kernel size, an output of the first path neural network being combined with an output of the second path neural network.

10. The method of claim 8, wherein the convolutional neural network of the prediction model operates by:
    mapping the first feature information obtained from the data store into intermediary information using a first convolutional neural network;
    combining the intermediary information with the first frame-change information to produce combined information; and
    mapping the combined information into the second feature information using another convolutional neural network.

11. A computing system for processing a stream of video frames, comprising:
    an image analysis system for receiving video frames that are interpreted as key frames, and for converting the key frames into instances of key-frame feature information;
    a prediction neural network for receiving video frames that are interpreted as predicted frames, and for converting the predicted frames, along with instances of frame-change information, into instances of predicted feature information;
    a data store for storing the instances of key-frame feature information produced by the image analysis system and the predicted feature information produced by the prediction neural network; and
    a motion-determining neural network for mapping pairs of consecutive video frames in the stream of video frames into the instances of the frame-change information the processing interpreting every nth frame in the stream of video frames as a key frame, and frames between neighboring key frames as predicted frames, n being specified by a configuration parameter, and the processing switching between use of the image analysis system and use of the motion-determining neural network and the prediction neural network depending on whether a key frame is encountered or a predicted frame is encountered in the stream of video frames.

12. The computing system of claim 11, wherein one particular pair of consecutive video frames includes a particular key frame and an immediately-following particular predicted frame.

13. The computing system of claim 11, wherein one particular pair of consecutive video frames includes a first predicted frame and an immediately-following second predicted frame.

14. The computing system of claim 11, wherein the image analysis system is a first image analysis system, and wherein the computing system includes a second image analysis system for converting the instances of the key-frame feature information and the instances of the predicted feature information into instances of output information.

15. The computing system of claim 11, wherein the motion-determining neural network includes, at least in part, a convolutional neural network.

16. The computing system of claim 11, wherein the prediction neural network includes, at least in part, a convolutional neural network.

17. The computing system of claim 16, wherein the convolutional neural network of the prediction neural network includes a first path neural network that uses a first kernel size and a second path neural network that uses a second kernel size, wherein the second kernel size is larger than the first kernel size.

18. A computer-readable storage medium for storing computer-readable instructions, the computer-readable instructions, when executed by one or more hardware processors, performing operations that comprise:

obtaining a first part of a data item having a sequence of parts, the first part being interpreted as a key part;

converting the first part into first feature information using a data item analysis process;

caching the first feature information in a data store;

obtaining a second part of the data item, the second part being interpreted as a predicted part;

mapping the first part and the second part into first part-change information using a motion-determining model, the first part-change information expressing a change in the data item from the first part to the second part;

converting the first part-change information and the first feature information into second feature information using a prediction model; and caching the second feature information in the data store, the operations interpreting every nth part in the sequence of parts as a key part, and parts between neighboring key parts as predicted parts, n being specified by a configuration parameter, and the operations switching between use of the image analysis system and use of the motion-determining model and the prediction model depending on whether a key part is encountered or a predicted part is encountered in the sequence of parts.

19. The computer-readable storage medium of claim 18, wherein the data item is video content, and wherein the first part and the second part are respectively a first frame and a second frame of the video content.

20. The method of claim 1, wherein the image analysis system consumes more computing resources for each frame it processes compared to the prediction system.

* * * * *